Patented Sept. 7, 1926.

1,598,688

UNITED STATES PATENT OFFICE.

GUSTAVUS A. NEW, OF NEW YORK, N. Y., ASSIGNOR TO L. S. & N. CORPORATION, A CORPORATION OF NEW YORK.

LIQUID COATING COMPOSITION.

No Drawing.　　Application filed April 15, 1922. Serial No. 553,110.

This invention is a liquid coating composition particularly adapted for coating metal, but which may be used for coating any object or material where the particular properties of the composition are desirable.

The coating composition according to this invention forms a tough, strongly adherent and flexible film, such that it will not crack or peel when the article to which it is applied is bent, or subjected to rough usage. The film, furthermore, is fireproof, and will stand very considerable heat without blistering or peeling.

The coating or film is also thoroughly waterproof, a property of particular merit in preventing rusting of metals; in addition it contains a material which is a positive preventative of rust.

The coating composition is particularly applicable to corset and collar steels, and is applied thereto by the process and apparatus as set forth in the patent to Hoyt H. Leland and Gustavus A. New, No. 1,503,128, granted July 29, 1924.

The body of the improved coating composition contains kauri gum, preferably India kauri gum, and China wood oil, the latter sometimes being called tung oil. Any desired thinners and dryers, such as turpentine and "Venolin" may be used. "Venolin" is the trade name for a dryer on the market today and contains kerosene, naphtha and carbon tetrachloride.

The composition contains an oxidizing agent, preferably manganese dioxide, which serves two important functions; it oxidizes and hardens the kauri gum, and aids in forming a rustproof coating over the metal.

Furthermore the composition preferably contains a filler such as a suitable iron oxide. An oxide which is itself a rust preventative such as the magnetic oxide, may be used. Other fillers may be added if desired. In case a very thin composition is desired, the filler could be omitted.

A suitable coloring agent may also be added; for a black composition, lampblack may be used; for a white composition, zinc oxide may be used.

The preferred ratio of the ingredients for a coating composition for coating corset steels is as follows:

| | Parts. |
|---|---|
| India kauri gum | 20 |
| China wood oil | 40 |
| Turpentine | 15 |
| "Venolin" | 10 |
| Lampblack | 10 |
| Manganese dioxide | 1 |
| Iron oxide | 4 |

The mixture is made up as follows: The China wood oil is boiled with constant stirring for two hours at 350° F. and allowed to settle, the precipitated fatty acids and solid impurities being separated from the oil. The India kauri gum is heated separately until fluid, and added slowly to the oil. The lampblack is ground with the turpentine to proper fineness and then added with constant stirring to the mixture of gum and oil, while the mixture is still hot.

The whole mix is now heated again to 350° F. and boiled with constant stirring six hours, and then cooled to about 110° F., after which "Venolin", the manganese dioxide and the iron oxide are added with thorough stirring; the mix is then filtered and stored for at least three weeks.

When the composition is used for making corset steels, about 1% of navy blue anilin dye or black dye is added to the mixture with the manganese and iron oxides.

The particular composition just described is slow drying and in practice the steel band which is being coated, and from which the steels are made, is dried in an electric or other suitable oven at about 450° F.—as described in the above mentioned patent. The time of drying may of course be varied by varying the quantity of dryer.

The invention is of course not limited to the exact proportions above set forth; for different uses, somewhat different proportions may be used. The approximate range is substantially as follows:

| | Parts. |
|---|---|
| India kauri gum | 10 to 25 |
| China wood oil | 30 to 55 |
| Turpentine | 5 to 20 |
| "Venolin" | 5 to 15 |
| Lampblack | 5 to 15 |
| Manganese dioxide | 1 to 2 |
| Iron oxide | 1 to 6 |

It should furthermore be understood that all of the above ingredients need not be used, and that recognized chemical equivalents of the several ingredients may be used. The broader aspects of the invention are as set forth in the appended claims.

While India kauri gum is preferred for the composition, it may be possible to use other grades of kauri gum. The best results are had with the purer form of kauri gum known as India kauri gum. Although described as particularly applicable for coating metal, such as corset steels, the coating composition may be used in many instances where paint and varnish are used, particularly where a fireproof, rustproof and waterproof covering is desired.

I claim as my invention:—

1. A liquid coating composition, containing kauri gum, China wood oil, manganese dioxide, and iron oxide.

2. A liquid coating composition, containing kauri gum, China wood oil, one to two parts of manganese dioxide and from one to six parts of iron oxide.

3. A liquid coating composition containing the following ingredients in approximately the indicated proportions:—

| | Parts. |
|---|---|
| India kauri gum | 20 |
| China wood oil | 40 |
| Manganese dioxide | 1 |
| Iron oxide | 4 |

4. A liquid coating composition, containing India kauri gum, China wood oil, turpentine, "Venolin", manganese dioxide and iron oxide.

5. A liquid coating composition, containing the following ingredients in approximately the indicated proportions:—

| | Parts. |
|---|---|
| Kauri gum | 20 |
| China wood oil | 40 |
| Turpentie | 15 |
| "Venolin" | 10 |
| Lampblack | 10 |
| Manganese dioxide | 1 |
| Iron oxide | 4 |

GUSTAVUS A. NEW.